United States Patent
Tukka et al.

(10) Patent No.: US 11,900,930 B2
(45) Date of Patent: Feb. 13, 2024

(54) METHOD AND APPARATUS FOR MANAGING VOICE-BASED INTERACTION IN INTERNET OF THINGS NETWORK SYSTEM

(71) Applicant: Samsung Electronics Co., Ltd., Suwon-si (KR)

(72) Inventors: Vijaya Kumar Tukka, Bangalore (IN); Deepraj Prabhakar Patkar, Bangalore (IN); Rakesh Kumar, Samastipur (IN); Sujay Mohan, Chikkaballapur (IN); Vinay Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 17/113,572

(22) Filed: Dec. 7, 2020

(65) Prior Publication Data

US 2021/0090567 A1 Mar. 25, 2021

Related U.S. Application Data

(63) Continuation of application No. 15/893,011, filed on Feb. 9, 2018, now Pat. No. 10,861,450.

(30) Foreign Application Priority Data

Feb. 10, 2017 (IN) .............................. 201741004892
Dec. 28, 2017 (IN) ............................ 2017 41004892

(51) Int. Cl.
*G10L 15/00* (2013.01)
*G10L 15/18* (2013.01)
(Continued)

(52) U.S. Cl.
CPC .............. *G10L 15/22* (2013.01); *G06F 3/167* (2013.01); *G10L 15/1815* (2013.01);
(Continued)

(58) Field of Classification Search
CPC ..... G10L 15/22; G10L 15/18; G10L 15/1815; G10L 15/30; G10L 15/32; G10L 17/00;
(Continued)

(56) References Cited

U.S. PATENT DOCUMENTS 6,754,629 B1 6/2004 Qi et al.
8,990,079 B1 3/2015 Newman
(Continued)

FOREIGN PATENT DOCUMENTS

| JP | 11-133994 A | | 5/1999 | |
|---|---|---|---|---|
| KR | 20160108443 A | * | 2/2015 | ............. G06F 1/325 |

(Continued)

OTHER PUBLICATIONS

European Office Action dated Jul. 6, 2021, issued in European Patent Application No. 18751718.0-1210.
(Continued)

*Primary Examiner* — Michael Ortiz-Sanchez
(74) *Attorney, Agent, or Firm* — Jefferson IP Law, LLP

(57) ABSTRACT

A method for managing voice-based interaction in an Internet of things (IoT) network system is provided. The method includes identifying a first voice utterance from a first IoT device among a plurality of IoT devices in the IoT network system. Further, the method includes identifying at least one second voice utterance from at least one second IoT device among the plurality of IoT devices in the IoT network system. Further, the method includes determining a voice command by combining the first voice utterance and the at least one second voice utterance. Furthermore, the method includes triggering at least one IoT device among the plurality of IoT devices in the IoT network system to perform at least one action corresponding to the voice command.

17 Claims, 15 Drawing Sheets

(51) Int. Cl.

| | |
|---|---|
| *G10L 15/22* | (2006.01) |
| *G10L 15/30* | (2013.01) |
| *H04L 67/12* | (2022.01) |
| *G06F 3/16* | (2006.01) |
| *H04L 67/025* | (2022.01) |
| *G10L 17/00* | (2013.01) |
| *H04W 64/00* | (2009.01) |
| *H04W 4/70* | (2018.01) |
| *H04W 4/02* | (2018.01) |
| *H04L 67/52* | (2022.01) |

(52) U.S. Cl.
CPC ............. *G10L 15/30* (2013.01); *G10L 17/00* (2013.01); *H04L 67/025* (2013.01); *H04L 67/12* (2013.01); *G10L 2015/223* (2013.01); *H04L 67/52* (2022.05); *H04W 4/02* (2013.01); *H04W 4/70* (2018.02); *H04W 64/006* (2013.01)

(58) Field of Classification Search
CPC ... G10L 17/06; G10L 17/22; G10L 2015/223; G10L 17/08; G10L 17/18; G10L 17/26; G10L 25/48; G10L 25/75; G10L 15/16; G10L 2015/088; G10L 2015/228; G10L 15/222; G10L 2015/225; G10L 15/00; G10L 15/20; G10L 25/51; G10L 15/083; G10L 2015/227; G06F 3/167; G06F 1/3206; G06F 1/325; H04L 67/12; H04L 67/125; H04L 67/025; H04L 67/52; H04L 67/535; H04W 4/02; H04W 4/025; H04W 4/70; H04W 64/006; H04W 64/00; H04W 4/00

See application file for complete search history.

(56) References Cited

U.S. PATENT DOCUMENTS

| | | |
|---|---|---|
| 9,070,367 B1 | 6/2015 | Hoffmeister et al. |
| 9,324,322 B1 | 4/2016 | Torok et al. |
| 9,558,740 B1 | 1/2017 | Mairesse et al. |
| 9,779,734 B2 | 10/2017 | Lee |
| 2007/0061301 A1 | 3/2007 | Ramer et al. |
| 2008/0165707 A1 | 7/2008 | Baird et al. |
| 2009/0299745 A1 | 12/2009 | Kennewick et al. |
| 2012/0173244 A1 | 7/2012 | Kwak et al. |
| 2013/0073293 A1 | 3/2013 | Jang et al. |
| 2013/0238326 A1 | 9/2013 | Kim et al. |
| 2014/0046464 A1* | 2/2014 | Reimann .................. G06F 3/167 700/94 |
| 2014/0337370 A1* | 11/2014 | Aravamudan ........ G06F 16/245 707/759 |
| 2015/0228274 A1* | 8/2015 | Leppanen ............... G10L 15/20 704/243 |
| 2015/0279356 A1* | 10/2015 | Lee .......................... G10L 15/20 704/251 |
| 2016/0148610 A1* | 5/2016 | Kennewick, Jr. ........ G10L 15/18 704/240 |
| 2016/0179462 A1 | 6/2016 | Bjorkengren |
| 2016/0283191 A1 | 9/2016 | Lu |
| 2017/0064412 A1 | 3/2017 | Taxier |
| 2017/0083281 A1 | 3/2017 | Shin |
| 2017/0083285 A1 | 3/2017 | Mayers et al. |
| 2017/0345420 A1* | 11/2017 | Barnett, Jr. ......... G10L 15/1815 |
| 2018/0007210 A1 | 1/2018 | Tadasco |
| 2018/0088902 A1* | 3/2018 | Mese ...................... G10L 15/22 |

FOREIGN PATENT DOCUMENTS

| | | | |
|---|---|---|---|
| KR | 10-2015-0113701 A | 10/2015 | |
| WO | WO-2015200207 A1 * | 12/2015 | ............. G06F 3/162 |

OTHER PUBLICATIONS

Todd Bishop, Amazon Alexa in every room? New $50 Echo Dot comes in a 12-pack for $500, GeekWire, Sep. 14, 2016, http://www.geekwire.com/2016/amazon-alexa-every-room-new-50-echo-dot-comes-12-pack-500/.

Jason Del Rey, Amazon has solved the Echo's echo problem, Recode, Sep. 14, 2016, http://www.recode.net/2016/9/14/12916688/new-amazon-echo-dot-spatial-perception.

Mark Szorady, Amazon Echo ESP (Echo Spatial Perception), Oct. 21, 2016, https://www.youtube.com/watch?v=hOKa_jqfDrQ.

Written Opinion and International Search Report dated Jul. 31, 2018, issued in International Application No. PCT/KR2018/001774.

European Search Report dated Nov. 27, 2019, issued in European Application No. 18751718.0-1210 / 3580750.

Indian Office Action dated Mar. 23, 2020, issued in Indian Patent Application No. 201741004892.

European Office Action dated Mar. 27, 2023, issued in European Patent Application No. 18 751 718.0-1210.

Indian Office Action dated Apr. 24, 2023, issued in Indian Patent Application No. 201741004892.

* cited by examiner

METHOD AND APPARATUS FOR MANAGING VOICE-BASED INTERACTION IN INTERNET OF THINGS NETWORK SYSTEM

CROSS-REFERENCE TO RELATED APPLICATION(S)

This application is a continuation application of prior application Ser. No. 15/893,011, filed on Feb. 9, 2018, which was based on and claimed priority under 35 U.S.C. § 119(a) of an Indian patent application number 201741004892, filed on Feb. 10, 2017, in the Indian Intellectual Property Office, and of an Indian patent application number 201741004892, filed on Dec. 28, 2017, in the Indian Intellectual Property Office, the disclosure of each of which is incorporated by reference herein in its entirety.

TECHNICAL FIELD

The disclosure relates to communication among one or more Internet of things (IoT) devices. More particularly, the disclosure relates to a method and apparatus for managing voice-based interaction in an IoT network system.

BACKGROUND

Internet of things (IoT) is based on the idea that everyday devices, not just computers and computer networks, can be readable, recognizable, locatable, addressable, and controllable via an IoT communications network (e.g., an ad-hoc system or the Internet).

All the devices in the IoT communications network environment leverages a voice based interaction system to perform the one or more operations as intended by a user. The voice based interaction system includes receiving a voice command (e.g., voice search command, speech, voice query, and/or voice search query etc.,) by the devices which are in vicinity thereto can facilitate user(s) with a response/service corresponding to the received voice command.

However, as in the IoT environment with multiple devices (i.e., voice assistance) around, the user initiates a voice query and all the devices processes it and responds individually with zero co-ordination there between. The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for managing voice-based interaction in an Internet of things (IoT) network system.

Another aspect of the disclosure is to provide a method and apparatus for providing continuous voice assistance in a multi-assistants (IoT) and multi-device environment.

Another aspect of the disclosure is to provide a method and apparatus for providing localization of user using a wearable device, which helps in deciding which IoT device to be given preference for processing and responding back to user query.

In accordance with an aspect of the disclosure, a method for managing voice-based interaction in an IoT network system is provided. The method includes identifying a first voice utterance from a first IoT device among a plurality of IoT devices in the IoT network system. Further, the method includes identifying at least one second voice utterance from at least one second IoT device among the plurality of IoT devices in the IoT network system. Further, the method includes determining a voice command by combining the first voice utterance and the at least one second voice utterance. Furthermore, the method includes triggering at least one IoT device among the plurality of IoT devices in the IoT network system to perform at least one action corresponding to the voice command.

In an embodiment, the first IoT device is located at a first location in the IoT network system, and the second IoT device is located at a second location in the IoT network system.

In an embodiment, the first location is different than the second location in the IoT network system.

In an embodiment, the first voice utterance is identified in a first time period and the second voice utterance is identified in a second period.

In an embodiment, the method for the determining of the at least one action corresponding to the voice command includes dynamically detecting an intent from the voice command, and determining the least one action corresponding to the voice command based on the intent.

In an embodiment, the method for the determining of the voice command by combining the first voice utterance and the at least one second voice utterance includes recognizing the first voice utterance and the at least one second voice utterance. Further, this method includes determining a confidence level to combine the first voice utterance with the at least one second voice utterance, and combining the first voice utterance with the at least one second voice utterance based on the confidence level.

In an embodiment, the method for the determining of the confidence level to combine the first voice utterance with the at least one second voice utterance includes determining confidence parameters associated with the first voice utterance and at least one second voice utterance and determining the confidence level of the first voice utterance to combine with the at least one second voice utterance based on the confidence parameters.

In an embodiment, the confidence parameters comprises at least one of a domain associated with the first voice utterance and the at least one second voice utterance, an intent associated with the first voice utterance and the at least one second voice utterance, location information associated with the first voice utterance and at least one second is received, a time at which the first voice utterance and the at least one second voice utterance is received, a user associated with the first voice utterance and the at least one second voice utterance, a context associated with the first voice utterance and the at least one second voice utterance, or a session associated with the first voice utterance and the at least one second voice utterance.

In an embodiment, the at least one IoT device suitable for performing the at least one action corresponding to the voice command is dynamically determined based on a plurality of parameters.

In an embodiment, the plurality of parameters comprises at least one of a location information of a user, a Received signal strength indication (RSSI) information, a head orientation information of the user, information of an IoT device proximity to the user while the user provides the voice command, a voice decibel level associated with at least one of the first voice utterance and the at least one second voice utterance, a noise level associated with an IoT device, or an availability of an IoT device.

In an embodiment, the plurality of parameters is dynamically determined based at least one wearable electronic device of the user.

In accordance with another aspect of the disclosure, an electronic device for managing voice-based interaction in an IoT network system is provided. The electronic device includes a voice-based interaction controller operably coupled to a processor. The voice-based interaction controller is configured to identify a first voice utterance from a first IoT device among a plurality of IoT devices in the IoT network system. Further, the voice-based interaction controller is configured to identify at least one second voice utterance from at least one second IoT device among the plurality of IoT devices in the IoT network system. Further, the voice-based interaction controller can be configured to determine a voice command by combining the first voice utterance and the at least one second voice utterance. Furthermore, the voice-based interaction controller can be configured to trigger at least one IoT device among the plurality of IoT devices in the IoT network system to perform at least one action corresponding to the voice command. Further, the electronic device apparatus includes a memory configured to store the voice command.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
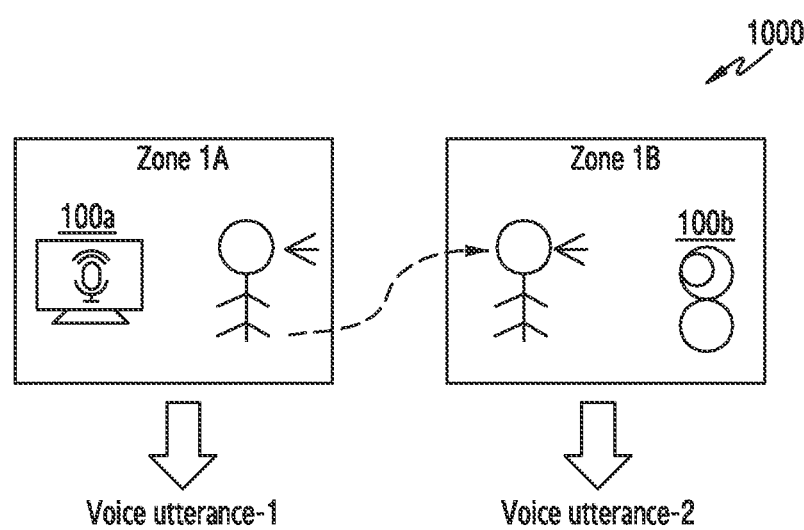
FIG. 1 is an example of an Internet of things (IoT) network system in which a IoT device individually processes multiple voice utterance received from a user(s) from different location, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, engines, controllers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "IoT" and variations thereof, as used herein, refers to "internet of things". As such, the terms "IoT" and "IOT" can be used interchangeably.

The term "zone", "location", "places" used herein can be used interchangeably without departing from the scope of the disclosure.

Continuous voice assistance: Here continuous voice assistance means when the user is moving across the different rooms (zones, location, etc.,), where single assistant (IoT) cannot hear the complete utterance of the user. All the assistants with multiple microphone channels, can address this when the user speaks complete utterance to the same assistant (without moving to another rooms).

FIG. 1 is an example of an Internet of things (IoT) network system 1000 in which an IoT device individually processes multiple voice utterance received from a user(s) from different location, according to an embodiment of the disclosure.

Referring to FIG. 1, consider an example scenario in which the user is moving freely across different zones (i.e., zone 1A and zone 1B) while conversation with each device 100a and 100b present therein. The conversation includes for e.g., voice utterane-1 (book a movie ticket) heard by device 100a, and voice utterane-2 (and also book a cab from my place to a cinema hall) heard by the device 100b. Hence, a user intended activity would be the voice utterance-1+ voice utterance-2.

On the other hand, in order to provide the user intended response/service, the user needs to utter complete sentence in front of only one device (100a or 100b). The user cannot move naturally while having conversation with multiple devices (100a and 100b). If the voice is heard by multiple devices (100a and 100b), then both the devices 100a and the 100b will process and respond back simultaneously, which disrupt the user experience.

Further, even if the voice utterance is heard by both the devices 100a and the 100b, then both the devices 100a and the 100b will process the voice query associated with the voice utterance and respond back simultaneously, again disrupting the user experience.

Accordingly, embodiments herein provide a method and apparatus for managing voice-based interaction in an IoT network system. The method includes identifying, by a voice assistance apparatus, a first voice utterance from a first IoT device in the IoT network system. Further, the method includes identifying, by the voice assistance apparatus, at least one second voice utterance from at least one second IoT device in the IoT network system. Further, the method includes determining, by the voice assistance apparatus, a voice command by combining the first voice utterance and the at least one second voice utterance. Furthermore, the method includes triggering, by the voice assistance apparatus, at least one IoT device in the IoT network system to perform at least one action corresponding to the voice command.

Unlike related art methods and systems, the proposed method can be used to consolidate a portion of a voice utterance received at all the IoT devices on a time basis (different zones).

For example, if the same voice utterance is heard at multiple IoT devices, then a preference, to respond to the voice utterance, is provided to IoT device that heard best.

Further, the proposed method can be used to identify the user intent based on a consolidated voice utterance (voice command) and process the voice command. Furthermore, the method includes sending the response to the best possible IoT device in a vicinity to the user. Thus, providing continuous and seamless experiences to the user.

Referring now to the drawings, and more particularly to FIGS. 2 through 9, where similar reference characters denote corresponding features consistently throughout the figures, there are shown preferred embodiments.

Figure 2:
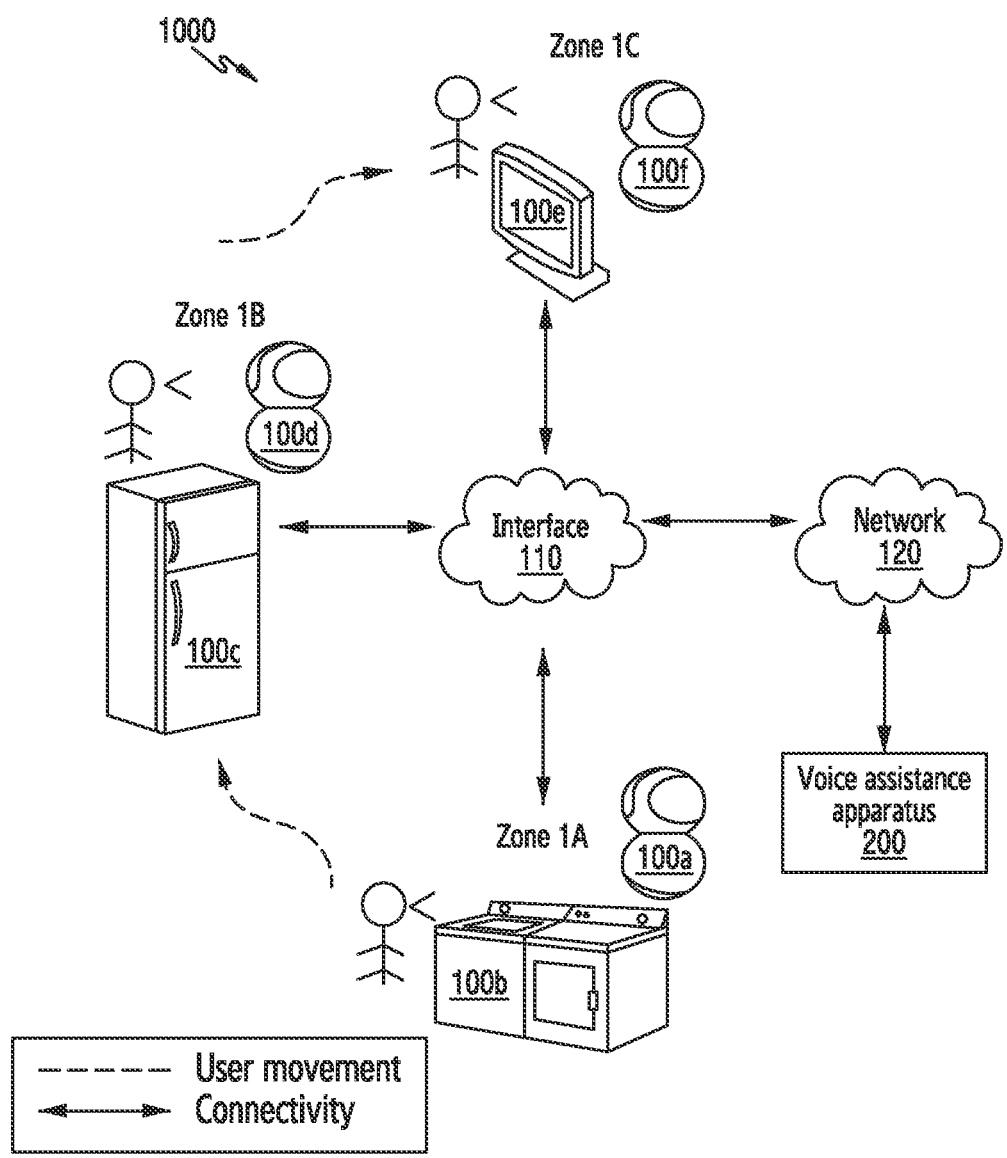
FIG. 2 illustrates a high-level architecture of an IoT network system, according to an embodiment of the disclosure.

FIG. 2 illustrates a high-level architecture of an IoT network system 1000, according to an embodiment of the disclosure.

Referring to FIG. 2, the electronic device 100a-100f (hereinafter collectively referred to as electronic device 100) can be, for example, a smartphone, a cellular phone, a tablet, a phablet, a dual display device, a portable multimedia device, personal digital assistants (PDAs), a gaming controller, edge-to-edge displays, etc. Further, the electronic device 100 can be a wearable device such as, for example, a smart watch, a smart bracelet, a smart glass, or the like. In another embodiment the electronic device 100 can be IoT device 100.

The IoT device 100 can be referred to any object (e.g., mobile devices, sensor, smart appliances such as refrigerators, TV, air conditioner (AC), toasters, ovens, microwaves, grills, rice cookers, juicers, freezers, dishwashers, dishes, hand tools, clothes washers, clothes dryers, water heaters, furnaces, air conditioners, thermostats, televisions, light, vacuum cleaners, sprinklers, electricity meters, gas meters, photo frames, watches, clocks, fans, speakers, etc.,) communicating information to one or more other objects through an interface 110 associated with each object respectively. The interface 110 such as, for example, an internet protocol (IP) address, wireless internet protocol, such as IEEE 802.11, a Bluetooth identifier (ID), RFID, a near field communication (NFC) ID, etc. In other words, any object capable of accessing resources/services (e.g., authentication, providing assistance to the user, etc.,) in the IoT network system 1000 can simply be referred to the IoT device 100. Although, the IoT devices 100 are shown to be communicating over the interface 110, but it is not limited thereto, the and IoT device 100 can also communicate over the direct wired connection (not shown) there between.

The IoT device 100 is configured to communicate with a network 120 through an access point (AP) (not shown) over a physical communications interface or layer. The network 120 can be a mobile network to which the IoT device 100 with a built-in modem capable can directly be connected. In another embodiment, the network 120 can be a fixed network through which the IoT device 100 connects via a gateway, the fixed network can be able to aggregate the IoT device(s) 100.

Further, the IoT network system 1000 includes a voice assistance apparatus 200 configured to manage the voice-signal of the user received from the IoT device(s) 100. In an embodiment, the voice assistance apparatus 200 can be located at a server (not shown) and can remotely accessible through the network 120, can be located in a cloud based architecture, i.e., a cloud based distributed architecture, and a cloud based centralized architecture. In another embodiment, the voice assistance apparatus 200 can be located in an Ad-hoc architecture, i.e., an Ad-hoc centralized architecture, and Ad-hoc distributed architecture. Although not shown, the IoT device 100 includes various sensors such as, for example, proximity sensors, optical, ambient light, temperature, pressure, Inertia, humidity, proximity, gesture, touch and fingerprint sensing applications. These sensors are based on a micro-electro-mechanical systems (MEMS) technology. Further, but not limited to, the IoT device 100 also includes motion/velocity/displacement/position sensors.

Figure 3:
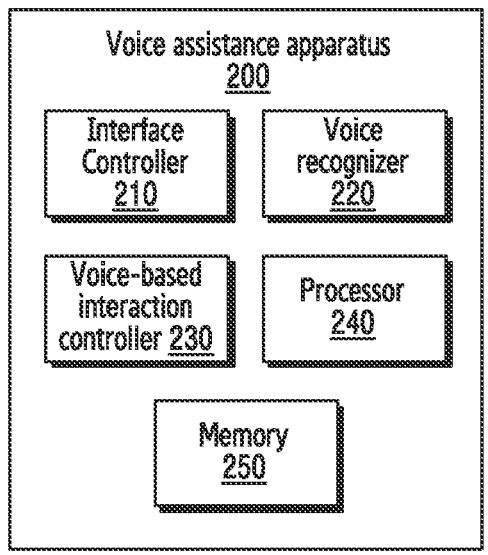
FIG. 3 is a block diagram illustrating various hardware components of a voice assistance apparatus, according to an embodiment of the disclosure.

FIG. 3 illustrates various hardware components of the voice assistance apparatus 200, according to an embodiment of the disclosure.

In an embodiment, the voice assistance apparatus 200 includes an interface controller 210, a voice recognizer 220, a voice based interaction controller 230, a processor 240 (e.g., central processing unit (CPU), graphics processing unit (GPU), hardware chipset, etc.) communicatively coupled to a memory 250 (e.g., a volatile memory and/or a non-volatile memory). The memory 250 includes storage locations configured to be addressable through the processor 240, and a communicator (not shown) configured to communicate internally with aforementioned hardware components, other hardware components, and externally with other components/IoT device 100 through any of the existing network communication means.

The interface controller 210 can be configured to provide an access control of the interface 110. For example, the interface controller 210 can include multiple configurations providing an option to select the type of interface 110 used to connect/communicate with the other IoT device/electronic devices. Further, the interface controller 210 can be configured to measure and indicate one or more interface parameters such as, for example, strength of the interface signal from the interface 100, IP address, MAC addresses of the interface 100, and the like.

The voice recognizer 220 can be configured to detect voice information received from at least one user associated with each/multiple IoT device(s) 100. The voice recognizer 220 can also include, for example, a voice sensor and a mike (not shown) configured to receive the voice utterances, a buzzer circuitry/a speaker (not shown) configured to provide an alert indicative signal (audio alert, verbal, etc.,) to the user, an acoustic detector(s), or the like. In an example embodiment, the voice recognizer 220 can be a biometric voice sensor configured to authenticate/identify the user based on the voice utterance provided. The constructional feature of the voice recognizer 220 is similar to that of any known voice sensor currently existing. For example, the voice recognizer 220 can include a membrane portion that detects pressure waves caused by user voice utterance (or, human speech). In an embodiment, the voice recognizer 220 can be configured to provide an action in response to detecting the voice utterance.

In another embodiment, the voice recognizer 220 can be configured to detect the voice utterance (e.g., at several location (zones) from multiple users) and transmit the voice utterance, detected, to the voice based interaction controller 230.

The voice based interaction controller 230, operably coupled with the voice recognizer 220, can be configured to receive the input(s) (e.g., voice utterances) from the voice recognizer 220. In an embodiment, in response to receiving the input(s), the voice based interaction controller 230 can be configured to provide set instructions to the voice recognizer 220 to take one or more actions. The one or more actions such as, for example, provide the alert indicative signal, response to the voice utterance, and the like.

Unlike related art methods and systems, the proposed method can be used to combine the voice utterances received at multiple IoT device 100 into a single query, then process the request.

The memory 250 may include one or more computer-readable storage media. The memory 250 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 250 may, in some examples, be considered a non-transitory storage medium. The term "non-transitory" may indicate that the storage medium is not embodied in a carrier wave or a propagated signal. However, the term "non-transitory" should not be interpreted to mean that the memory 250 is non-movable. In some examples, the memory 250 can be configured to store larger amounts of information than the memory. In certain examples, a non-transitory storage medium may store data that can, over time, change (e.g., in random access memory (RAM) or cache). The memory 250 may be used for storing the user voice utterances captured from IoT device(s) 100, storing partially merged utterances along with data such as confidence level etc., completely merged utterances along with data such as confidence level etc., maintain history of user utterances, information regarding IoT device(s) 100 along with additional data such as their corresponding location etc.

The processor 240 controls the general operation of the voice assistance apparatus 200. For example, the processor 240 transmits and receives a signal through the interface controller 210. Further, the processor 240 records data in the memory 250 and reads the recorded data. The processor 240 may performs functions of a protocol stack that is required from a communication standard. According to another implementation, the protocol stack may be included in the interface controller 210. To this end, the processor 240 may include at least one processor or microprocessor, or may play the part of the processor. Further, the part of the interface controller 210 or the processor 240 may be referred to as a communication processor (CP).

According to various embodiments of the disclosure, the processor 240 may identify a first voice utterance from a first IoT device in the IoT network system, identify at least one second voice utterance from at least one second IoT device in the IoT network system, determine a voice command by combining the first voice utterance and the at least one second voice utterance, and trigger at least one IoT device in the IoT network system to perform at least one action corresponding to the voice command. For example, the processor 240 may control the voice assistance apparatus 200 to perform operations according to the embodiments of the disclosure.

FIG. 3 shows hardware components of the voice assistance apparatus 200 but it is to be understood that other embodiments are not limited thereon. In other embodiments, the voice assistance apparatus 200 may include less or more number of hardware components. Further, the labels or names of the hardware components are used only for illustrative purpose and does not limit the scope of the disclosure. One or more hardware components can be combined together to perform same or substantially similar function in the voice assistance apparatus 200.

Figure 4:
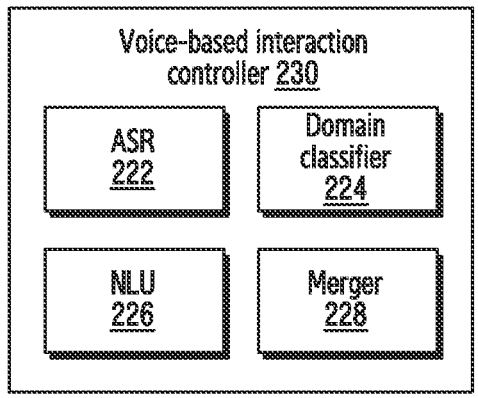
FIG. 4 is a block diagram illustrating various hardware components of a voice based interaction controller, according to an embodiment of the disclosure.

FIG. 4 illustrates various hardware components of the voice based interaction controller 230, according to an embodiment of the disclosure.

The voice based interaction controller 230 includes an automatic speech recognizer (ASR) 222, a domain classifier (DC) 224, a natural language understanding (NLU) 226, and a merger 228.

The ASR 222 can be configured to generate an output indicative of the voice utterances (speech utterances) detected by the voice recognizer 220. The ASR 222, can, be coupled to a speech interpreter (not shown) configured to manage a digital vocabulary with data items (words, text, keywords, synonyms of keywords, meaning of keywords, or the like) in a memory 250. In an example embodiment, the ASR 222 can be configured to communicate with various vocabulary data sources using the network 120 for identifying the user(s) voice utterances (first voice utterance, second voice utterance, and the like).

Further, the ASR 222 can be configured to intelligently identify/differentiate the various voice utterances provided by the user. For example, voice utterance may vary with respect to the characteristics of each user such as user accent, user emotions, user voice volume, etc. The ASR 222 can be configured to convert the derived speech into text using speech-text conversion mechanism (not detailed herein).

The text derived from the ASR 222 serves as an input to the DC 224. In an embodiment, the DC 224 can be configured to extract the domain associated with speech outputted by the ASR 222. For example, the domain herein may represent one or more subject matter areas, such as messaging, shopping, media, application context based, movie ticket booking, and the like.

According to various embodiments of the disclosure, various confidence levels may be defined. The confidence level can be determined based at least one confidence parameter, and the confident level indicates a level at which a specific parameter can be identified from a voice utterance. The confidence parameters comprise at least one of a domain associated with a voice utterance, an intent associated with a voice utterance, location information associated with a voice utterance, a time at which a voice utterance is received, a user associated with a voice utterance, a context associated with a voice utterance, and a session associated with a voice utterance.

For example, if a first voice utterance received by the first IoT device is "send" then a domain confidence level is 10% as the domain is not identified from the first voice utterance, received. Further, if a second voice utterance received by the second IoT device is "message" then a domain confidence level is increased from 10% to 40%, as the "message" is classified as one of the domain. Thus, once the domain associated with the multiple partial voice utterance is identified (based on the domain confidence level) then a user intended activity in the classified domain can be computed.

The NLU 226 can be configured to perform a match between the one or more partial voice utterances, received, by the voice assistance apparatus 200 by computing a probability there between. Thus, based on the probability computed, the NLU 226 can be configured to determine the user intend confidence level (to determine the user intended activity) associated with each voice utterance prior to providing the instructions to merge the voice utterances.

Figure 5:
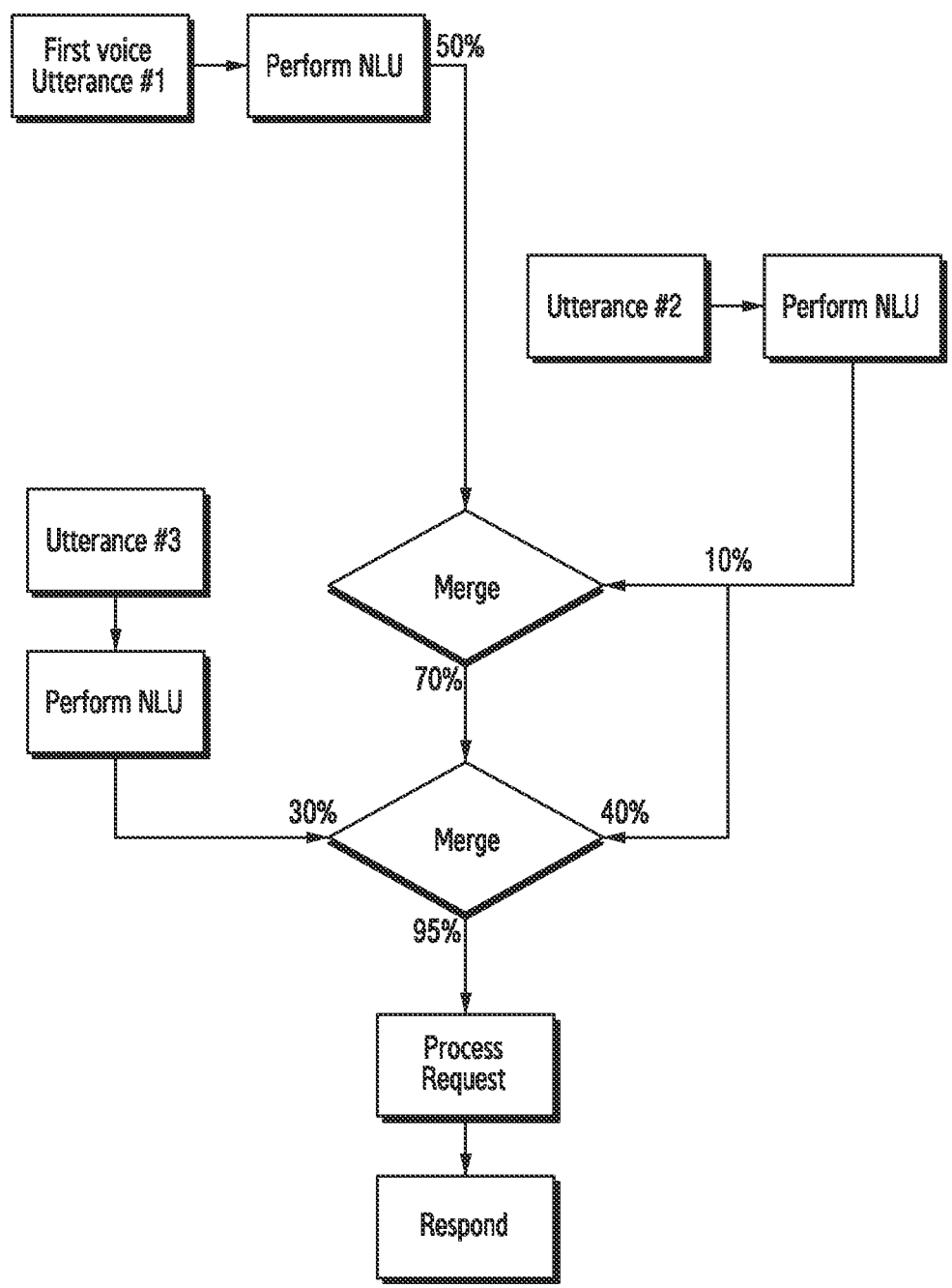
FIG. 5 illustrates a process of computing a confidence level to combine a first voice utterance with at least one second voice utterance, according to an embodiment of the disclosure.

For example, if the user of the IoT device 100 (e.g., 100b) provides the first voice utterance "send a message", then the IoT device 100 may not be able to understand which message (e.g., SMS, SNS, etc.,) needs to be sent to whom. Thus, the user intend confidence level of the IoT device 100 with regards to the first voice utterance is minimal (e.g., 40%). Further, if the user again provides the second voice utterance (i.e., through SNS application) to the IoT device 100 (e.g., 100b), then the user intended confidence level of the IoT device 100 increases from 40% to 60%. Further, if the user, yet again, provides a third voice utterance i.e., to my friend "Michael", then the user intended confidence level of the IoT device 100 increases from 60% to 85%. Thus, the NLU 226 can be configured to dynamically compute the user intend confidence level for each voice utterance received from multiple IoT devices (e.g., IoT device 100a, IoT device 100b, IoT device 100c, etc.) based on the probability match computation between the first voice utterance and each successive voice utterance thereof (as shown in FIG. 5).

The NLU 226 can further be configured to compute the other confidence parameters for the first voice utterance, at least one second voice utterance (includes third voice utterance, fourth voice utterance, and so on), the confidence parameters such as, for example, location information associated with the first voice utterance and at least one second voice utterance received, a time at which the first voice utterance and the at least one second voice utterance is received, a user associated with the first voice utterance and the at least one second voice utterance, a context associated with the first voice utterance and the at least one second voice utterance, and a session associated with the first voice utterance and the at least one second voice utterance.

The output of both the DC 224 and the NLU 226 can be served as the input to the merger 228 to consolidate all the voice utterance in order to determine the voice command. Further, in addition to the output of both the DC 224 and the NLU 226, the merger 228 also consider the parameters such as, for example, the type of user (authorized/unauthorized), context of the IoT device 100, and a context of merger 228.

Once the voice command is processed, the least one IoT device 100 in the IoT network system 1000 configured to perform at least one action corresponding to the voice command is selected based on a plurality of parameters. The plurality of parameters such as, for example, at least one of location information of a user, a received signal strength indication (RSSI) information, a head orientation information of the user, information of the IoT device 100 proximity to the user while the user provides the voice utterance, a voice decibel level associated with at least one of the first voice utterance and the at least one second voice utterance, a noise level associated with the IoT device 100, and an availability of the IoT device 100.

FIG. 4 shows hardware components of the voice based interaction controller 230 but it is to be understood that other embodiments are not limited thereon. In other embodiments, the voice based interaction controller 230 may include less or more number of hardware components. Further, the labels or names of the hardware components are used only for illustrative purpose and does not limit the scope of the disclosure. One or more hardware components can be combined together to perform same or substantially similar function in the voice based interaction controller 230.

Figure 6:
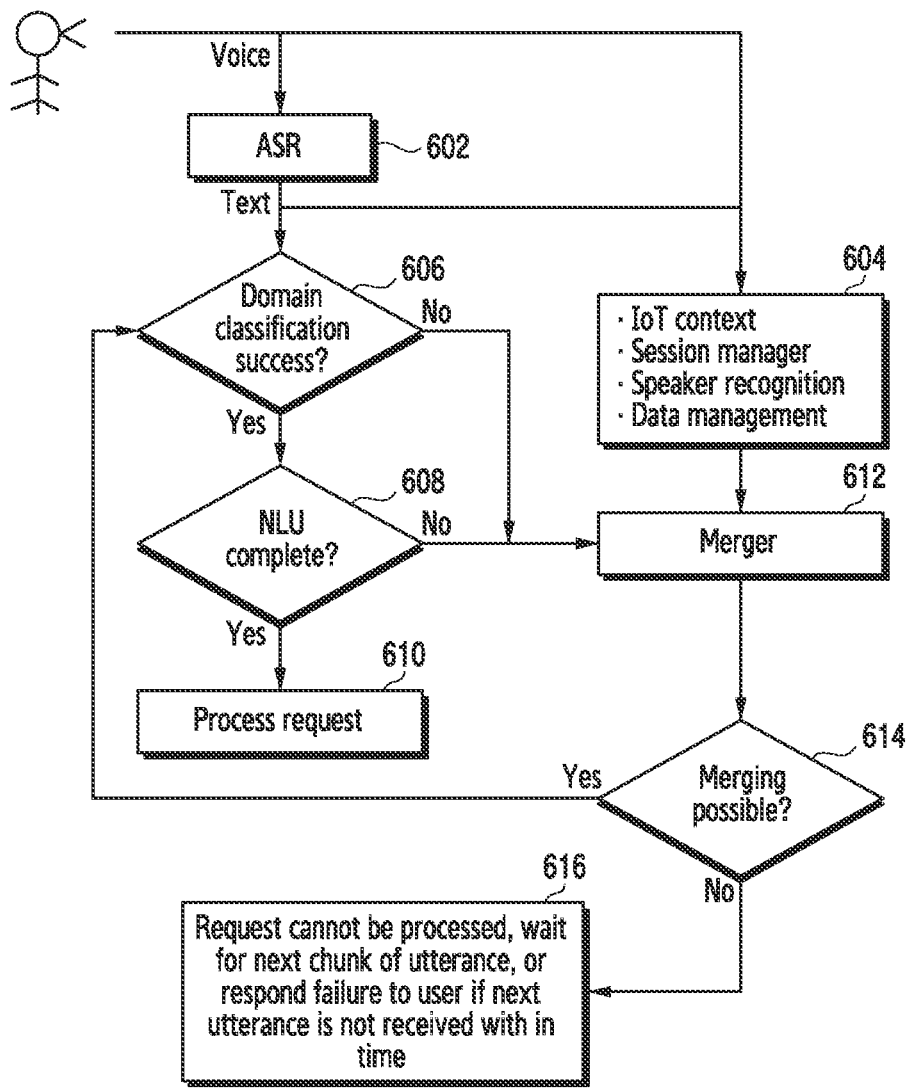
FIG. 6 is a flow diagram illustrating a method for merging the first voice utterance with at least one second voice utterance, according to an embodiment of the disclosure.

FIG. 6 is a flow diagram illustrating a method for merging the first voice utterance with the at least one second voice utterance, according to an embodiment of the disclosure.

Referring to FIG. 6, at operation 602, the method includes converting the voice utterance into text (or, speech) using the ASR technique. In an embodiment, the method allows the ASR 222 to convert the voice utterance into text (or, speech) using the ASR technique.

The received voice utterance, and the outputted text by the ASR 222, are then used, at operation 604, as a reference to determine the plurality of parameters based on the received voice utterance and current state of the IoT device 100. The plurality of parameters such as i.e., context of IoT device 100 (location of the user, mic location, etc.,) speaker recognition (user identification), personnel language modelling (voice decibel (dB) level, voice utterance time, etc.), and sentence structure for a voice utterance.

Further, at operation 606, the method includes determining whether the domain classification success of the text outputted by the ASR 222 is possible. In an embodiment, the method allows the DC 224 to determine whether the domain classification success of the text outputted by the ASR 222 is possible with acceptable confidence levels.

If, at operation 606, the DC 224 determines that the domain classification success of the text outputted by the ASR 222 is possible with acceptable confidence levels, then at operation 608, the method includes determining whether the NLU can be computed. In an embodiment, the NLU 226 can be configured to determine whether the NLU to the outputted text can be computed with acceptable confidence levels.

If, at operation 608, the NLU 226 determines that the NLU to the outputted text can be computed with acceptable confidence levels, then, at operation 608, the method includes processing the request for the voice utterance.

If, at operation 606, the DC 224 determines that the domain classification success of the text outputted by the ASR 222 is not possible with acceptable confidence levels, and at operation 608, the NLU 226 determines that the NLU to the outputted text cannot be computed; then the merger 228, at operation 612, can be configured to merge the voice utterance based on the plurality of parameters determined at operation 604.

According to various embodiments of the disclosure, the possibility of merging voice utterances can be determined based on at least one of the plurality of parameters determined at operation 604. The possibility of merging voice utterances can be construed as whether the voice utterances are successive and/or continuous, or they are distinct from each other. For example, if the voice utterances are successive and/or continuous, they are possibly to be merged, and vice versa. On the other hand, if the voice utterances are distinct, they are impossible to be merged, and vice versa.

According to various embodiments of the disclosure, the possibility of merging voice utterances can be determined based on whether the user is moving. The processor 240 is configured to determine whether the received voice utterance is a voice utterance for a moving user. The processor 240 is configured to determine an average received power of each of words composing the received voice utterance. If average received powers for successive words change more than a threshold, the processor 240 may determine that the user is moving, and the received voice utterance is a voice utterance for the moving user. The moving state of the user (=a state indicating that the user is moving) can be notified to a wearable device worn by the user, and can be presented to the user through a user interface of the wearable device. If a plurality of voice utterances for the moving users are identified in different IoT devices, the plurality of voice utterances can be determined as being possibly to be merged.

According to various embodiments of the disclosure, the possibility of merging voice utterances can be determined based on a sentence structure of each of received voice utterances. For example, the processor 240 can determine whether a sentence identified from each voice utterance is an incomplete sentence a complete sentence. If a plurality of sentences of voice utterances can be complete sentence when merged according to a suitable order even though each of them is incomplete sentence, the voice utterances are possibly to be combined.

According to various embodiments of the disclosure, the possibility of merging voice utterances can be determined based on a user identification and a voice utterance time. For example, voice information for at least one user can be stored in memory 250. The processor 240 can extract voice information from the received voice utterance, compare the extracted voice information with the stored voice information, and determine a user identification for the received voice utterance. Also, the processor 240 can identify a voice utterance time for each voice utterance. The voice utterance time may refer to a time at which the voice utterance is received by an IoT device 100. The processor 240 can determine whether a plurality of voice utterances with the same user identification are received at an interval less than a threshold interval based on the user identification and the voice utterance time for each voice utterance. If the plurality of voice utterances with the same user identification are received at an interval less than the threshold interval, the plurality of voice utterances can be determined as being possibly to be merged.

The above stated examples of determining merging possibility are just for illustration only. The processor 240 can also determine the possibility of merging voice utterances based on at least one of the plurality of parameters determined at operation 604 apart from the examples stated above.

According to various embodiments of the disclosure, the merging of voice utterances may comprise arranging voice utterances that are possibly to be merged in an order of voice utterance time, and concatenating the arranged voice utterances. The merging of voice utterances may further comprise omitting a duplicate part of the voice utterances from at least one of the voice utterances.

According to various embodiments of the disclosure, the merging of voice utterances may comprise merging the same voice utterances which are received by IoT devices at a relatively low power. For example, if the user generating voice utterance is far from all of the IoT devices, the voice utterance is received by each IoT device at a relatively low power. In this case, a single voice utterance has a low power that is not enough for identifying a voice command or an intend from the voice utterance. Therefore, by merging the same voice utterances which are received by IoT devices at a relatively low power, the processor 240 can extract a voice command or an intend from the merged voice utterances having a relatively high power.

According to various embodiments of the disclosure, the merging of voice utterances can be construed as an operation or a series of operations to enhance a confidence level of voice command that can be extracted from at least one of the voice utterances.

Further, at operation 614, the method includes determining whether merging of the voice utterance is possible. If at operation 614, the merger 228 determines that the merging of the voice utterance is possible, then, the voice utterance is transmitted to perform the operations disclosed at operations 606-610. If at operation 614, the merger 228 determines that the merging of the voice utterance is not possible, then at operation 616, the method includes providing a notification to the user, notification including i.e., request cannot be processed, wait for next chunk of utterance, or respond failure to user if next utterance is not received with in time.

For example, when the user is moving while talking in the IoT environment, then the voice heard at all the IoT devices 100 will be voice chunks heard when the user is near to that IoT devices 100. Hence none of the IoT devices 100 can independently handle the query of the user. Unlike to related art methods and systems, the propose method can be used to aggregate all the voice chunks heard at different assistants, and then consolidates all the split utterances captured into a single complete utterance and then find the intent of the user and process the request, and respond back to the user on the best nearby IoT device 100 while the user ended the last conversation.

The various actions, acts, blocks, steps, or the like in FIG. 6 may be performed in the order presented, in a different order or simultaneously. Further, in some embodiments, some of the actions, acts, blocks, steps, or the like may be omitted, added, modified, skipped, or the like without departing from the scope of the disclosure.

Figure 7A:
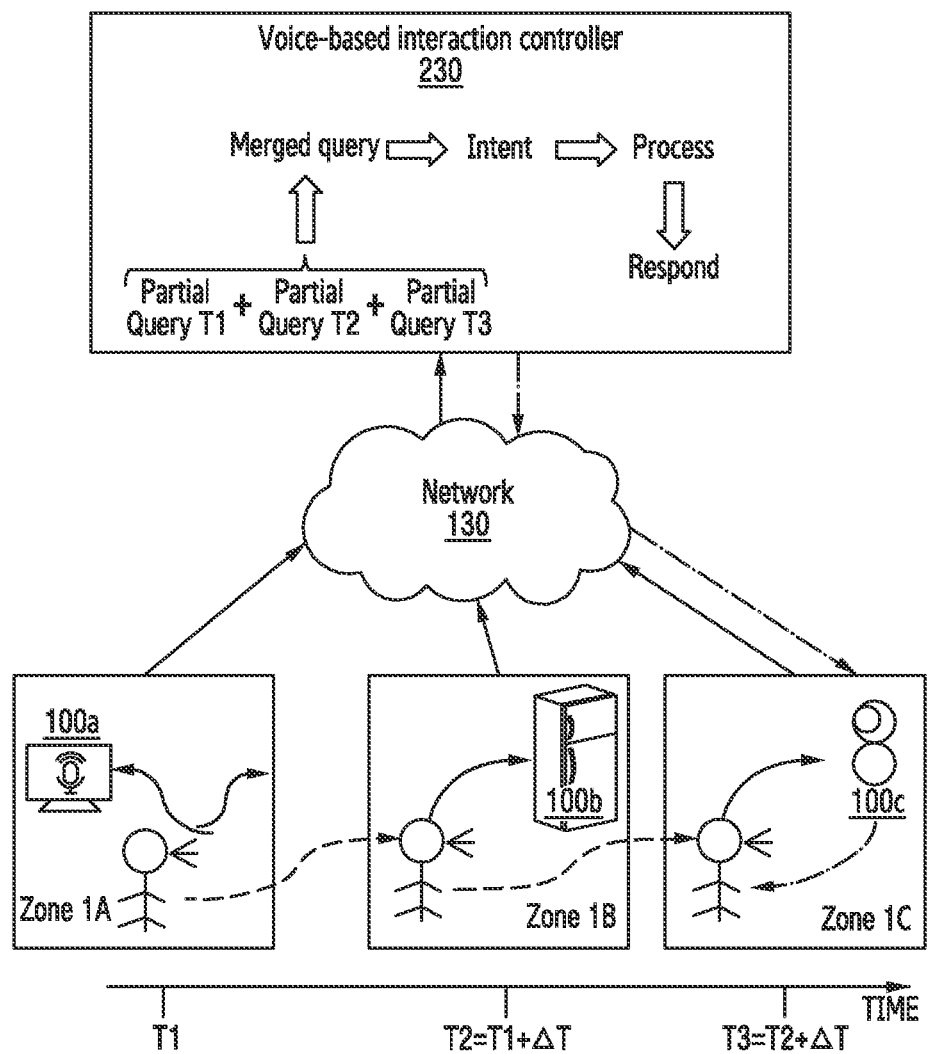
FIGS. 7A, 7B, and 7C are an example of the IoT network system in which the voice based interaction controller processes the multiple voice utterance received by the IoT device for providing continuous voice assistance, according to various embodiments of the disclosure.
Figure 7B:
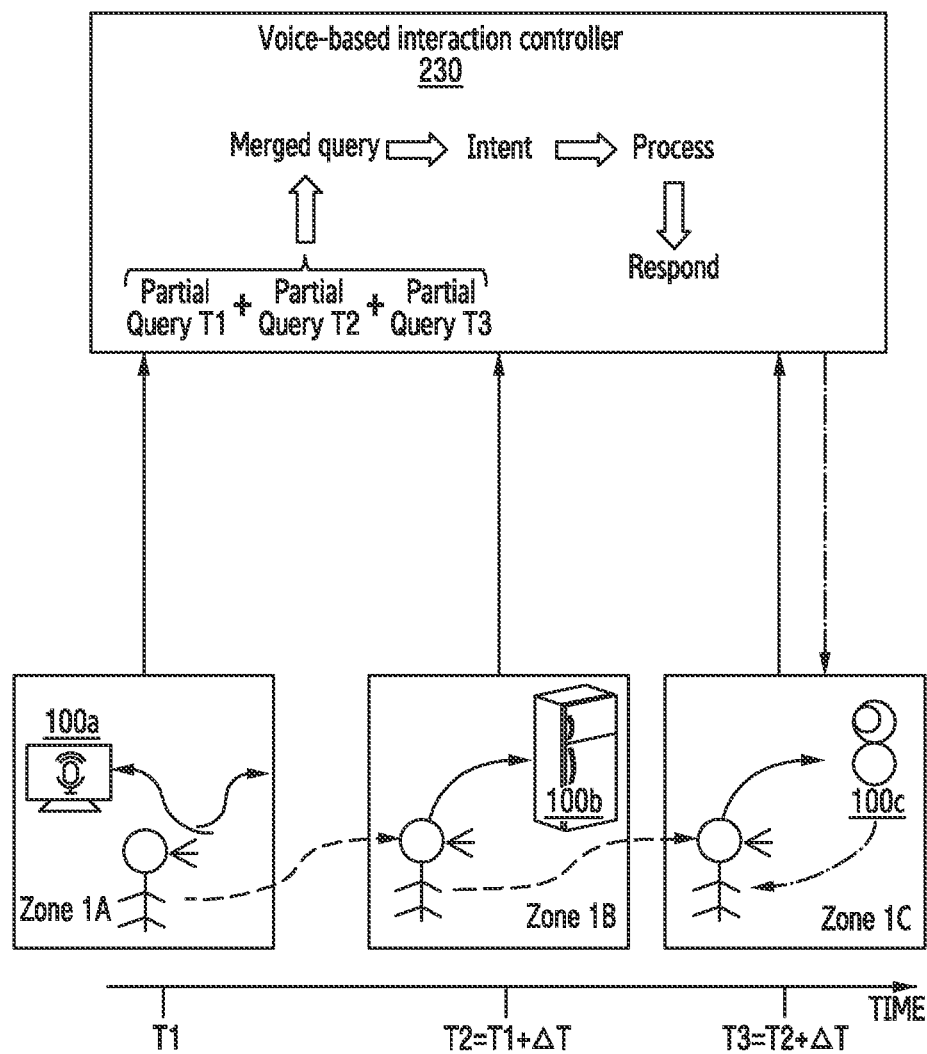
Figure 7C:
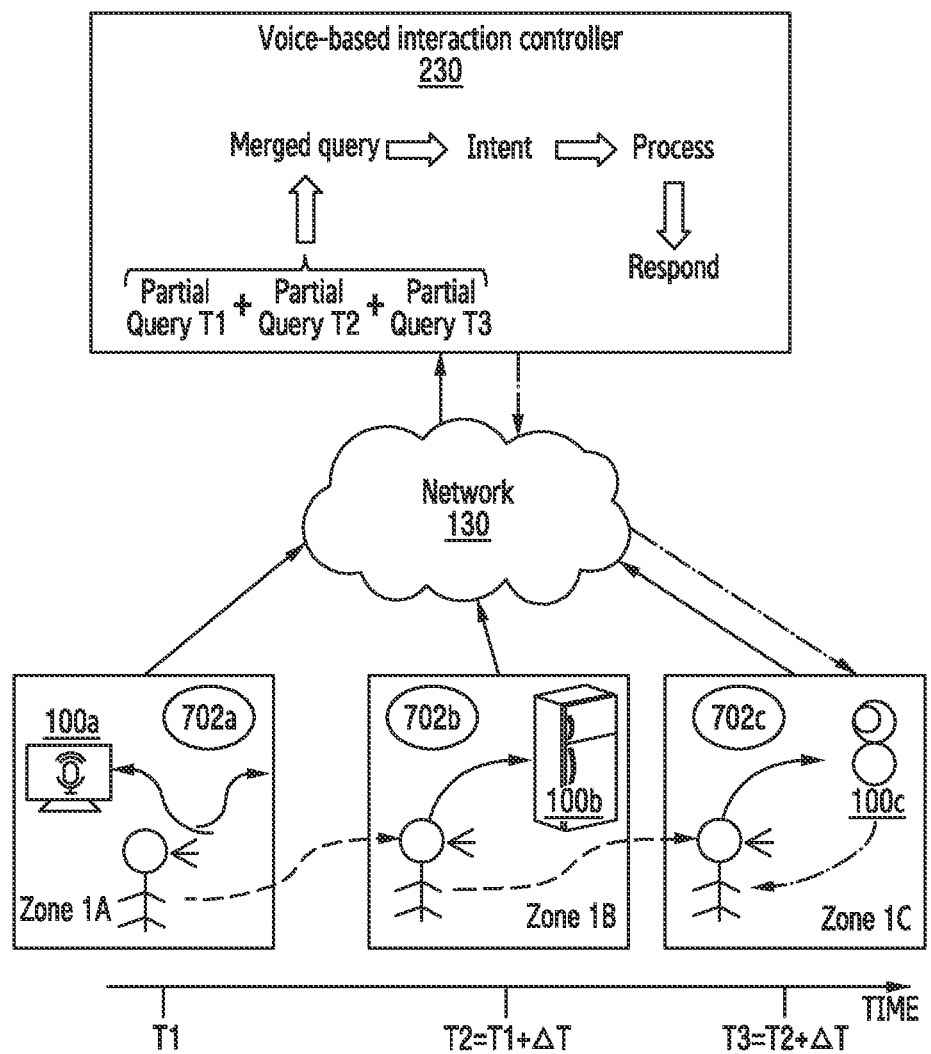

FIGS. 7A, 7B, and 7C are an example of the IoT network system in which the voice based interaction controller processes the multiple voice utterance received by the IoT device for providing continuous voice assistance, according to various embodiments of the disclosure.

FIG. 7A is an example of the IoT network system 1000 in which the voice based interaction controller 230 processes the multiple voice utterance received by the IoT device 100 (100a, 100b, 100c) for providing continuous voice assistance, according to an embodiment of the disclosure.

Referring to FIG. 7A, the various steps involved in providing continuous assistance are as detailed herein. The voice based interaction controller 230 can be configured to merge all the portion of voice utterance received at all the IoT device 100 (100a, 100b, 100c) on time basis (T). Thus, when the user gives the voice utterance comprising a voice command while moving from one location to another location, a portion of the voice command is received by the first IoT device and another portion of the same voice command is received by the second IoT device. As seen in FIG. 7A, when the user gives the voice utterance to the IoT device 100a at zone 1A, the voice utterance to the IoT device 100b at zone 1B, and the voice utterance to the IoT device 100c at zone 1C, then the voice based interaction controller 230 (accessible through network 130) can be configured to receive all the voice utterance i.e., partial voice query at time T1, partial voice query at time T2, and partial voice query at time T3 are merged in a time based manner to form a combined voice command. The combined voice command is processed to identify the user intention and response is generated. Referring to FIG. 7B, the voice based interaction controller 230 can be an Ad-hoc.

FIGS. 8A-8E are example scenarios in which the voice assistance apparatus provides continuous voice assistance using best suitable speaker/IoT device 100, according to various embodiments of the disclosure.

Figure 8A:
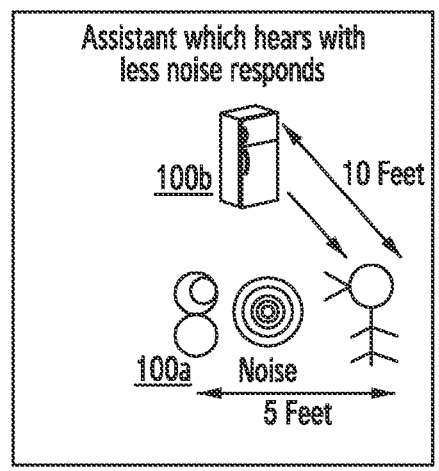
FIGS. 8A, 8B, 8C, 8D, and 8E are example scenarios in which the voice assistance apparatus provides continuous voice assistance using best suitable speaker/IoT device, according to various embodiments of the disclosure.
Figure 8B:
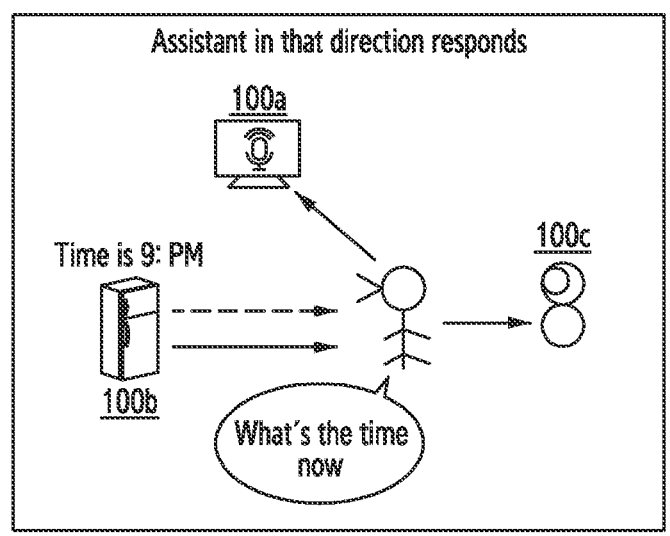
Figure 8C:
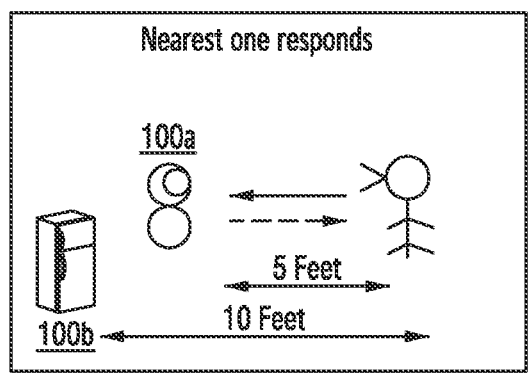
Figure 8D:
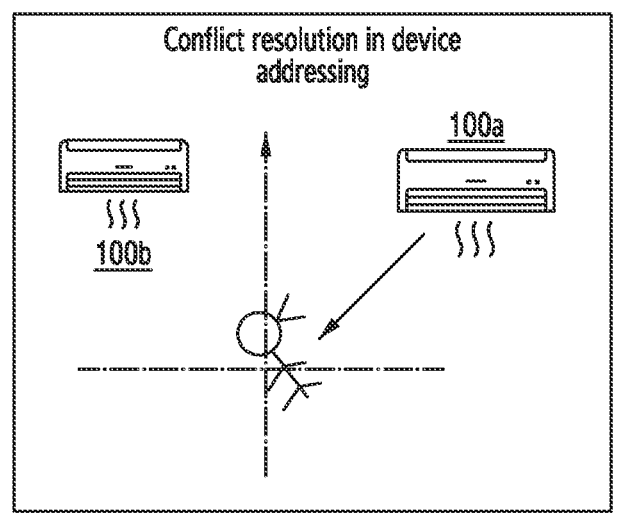
Figure 8E:
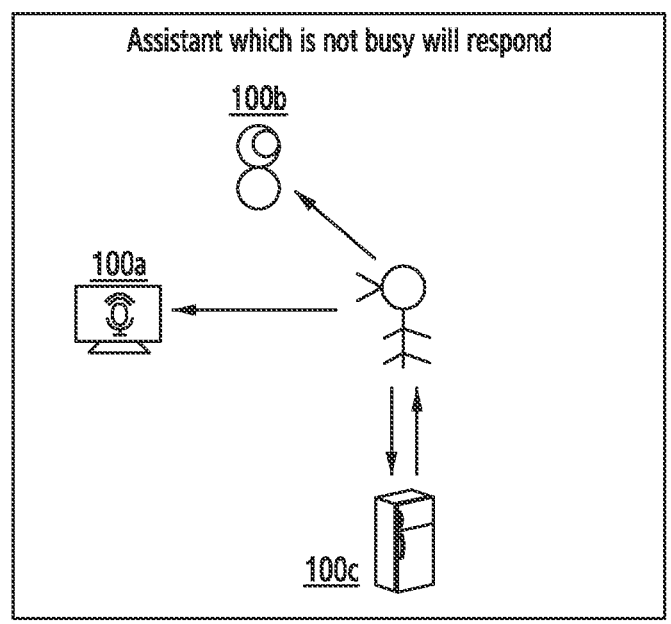

Further, if the same voice utterance is heard at multiple IoT devices 100, then the voice based interaction controller 230 can be configured to give a preference to best heard IoT device 100. Furthermore, the method includes sending the response to the best possible IoT device 100 around the user. In an embodiment, the best heard IoT device 100/best possible IoT device 100 around the user can be selected based on the IoT device 100 which heard the voice utterance with less noise levels (as shown in FIG. 8A), the IoT device 100 in the direction of the receiving voice utterance (as shown in FIG. 8B), the IoT device 100 nearest to the user (as shown in FIG. 8C), the IoT device 100 based on conflict resolution (as shown in FIG. 8D), the IoT device 100 which is not busy (as shown in FIG. 8E), the IoT device 100 which heard the voice utterance with maximum voice signal strength, the IoT device 100 which heard first among all other assistants, etc.

Referring to FIG. 7C, the voice assistance with wearable device 702a, 702b, and 702c (hereinafter collectively referred to as wearable device 702) is illustrated, according to an embodiment as disclosed herein. The wearable device 702 helps in user localization. The wearable device 702 aids the user in deciding which assistant (IoT assistant) to be given preference for processing and responding back to the user query (voice utterance). In an embodiment, the user head orientation and the voice signal strength at which the user utters can be determined using the wearable device 702 (such as HMD). This orientation helps in directional assistance use cases. If there is no assistant in proximity then the wearable device 702 can send voice data over Bluetooth low energy (BLE) to nearby IoT device 100. If the IoT assistances have been configured to wake up on a particular action such as predefined voice utterance (e.g., "Hey Bixby"), then the wearable device 702 provides proximity based assistant wake up while the user is talking to the IoT device(s) 100 while moving across zones. When the user is moving across different locations while continuously talking to the IoT device 100, then the wearable device 702 can send trigger signals to other IoT assistants where the user is moving in order to capture the user's next portion utterance without missing any portion of user's utterance and to provide continuity experience.

Figure 9:
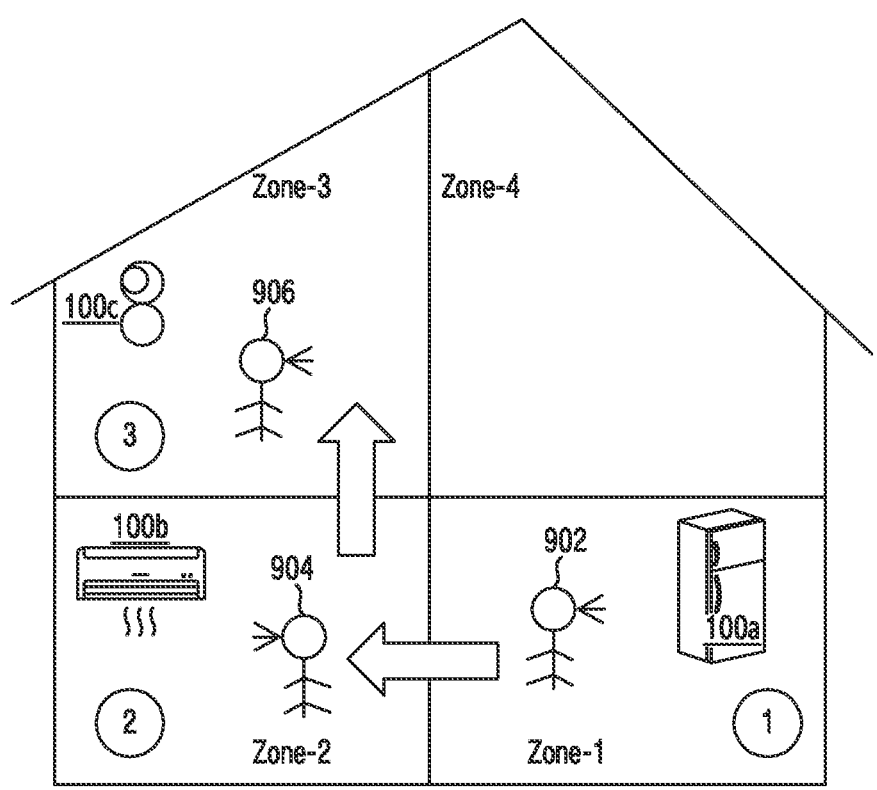
FIG. 9 is an example scenario in which the continuous voice assistance in multi-user case is demonstrated, according to an embodiment of the disclosure.

FIG. 9 is an example scenario in which the continuous voice assistance in multi-user case is demonstrated, according to an embodiment of the disclosure.

Referring to FIG. 9, in this scenario, while placing a single order online, allowing others to continuously add items to the order. The voice assistance apparatus 200 consolidates all data, understands intent of the user, and processes the request.

For example, the user at zone-1 provides a first voice utterance 902 to the IoT device 100a "Place an order for following items on online shopping application. Tomato One Kilo, and Ten Eggs". Further, the user 904 moves to the zone-2 and continue to provide to place the order by providing the second voice utterance 904 "and an 8 GB USB stick" heard by the IoT device 100b. Thus, the IoT device 100b can be configured to display the order items by merging the first voice utterance and the second voice utterance "Place an order for following items on the online shopping application. Tomato One Kilo, Ten Eggs, and 8 GB USB stick". Thus, providing the continuous voice assistance to the user Similar operations are performed by the IoT device 100c at third zone with a third voice utterance 906 and any other IoT devices at subsequent zones.

For another example, the user at zone-1 may provide a first voice utterance 902 to the IoT device 100a. The intent of the first voice utterance 902 may be, for example, writing a text for an e-mail or a text message, or placing an order for item(s) on online shopping. The IoT device 100a may identify an identification of the user based on a user identification for the first voice utterance 902. Also, the IoT device 100a may detect a device carried by the user (e.g., smart phone, tablet, etc.) within a preset distance from the IoT device 100a, and may identify an identification of the user based on information on the detected devices. The device carried by the user may comprise a wearable device (e.g., gear device) worn by the user. The IoT device 100a can transmit at least one of voice data corresponding to the first voice utterance 902, or the identification of the user, to the voice assistance apparatus 200. According to various embodiments of the disclosure, the IoT device 100a can summarize and/or interpret the intent of the first voice utterance 902, and can present information corresponding to the first voice utterance 902 though at least one of a display of the IoT device 100*a*, or a speaker of the IoT device 100*a*.

Further, the user may move to the zone-2, where the IoT device 100*b* exists. The IoT device 100*b* can identify that the user is within a threshold distance from the IoT device 100*b*. For example, the IoT device 100*b* can identify that the user is within a threshold distance from the IoT device 100*b* based on at least one of an indoor positioning system (IPS) information of the device carried by the user, or a signal strength of a signal received from the device carried by the user, or a motion sensor of the IoT device 100*b*. The IoT device 100*b* can report at least one of a time at which the user is identified as being within the threshold distance from the IoT device 100*b*, an identification of the user, or information that someone is in a vicinity of the IoT device 100*b*, to the voice assistance apparatus 200. The voice assistance apparatus 200 then may determine whether a first condition or a second condition is satisfied. Herein, the first condition may be defined as that a difference between a time at which information regarding the first voice utterance 902 is received by the voice assistance apparatus, and the time at which the user is identified as being within the threshold distance from the IoT device 100*b*, is within a threshold period of time. The second condition may be defined as that the identification of the user identified by the first IoT device 100*a* is the same as the identification of the user identified by the second IoT device. If at least one of the first condition or the second condition is satisfied, the voice assistance apparatus 200 may determine that the second voice utterance 904 to be provided by the user can be possibly merged with the first voice utterance 902, and can control the IoT device 100*b* to present information corresponding to the first voice utterance 902 though at least one of a display of the IoT device 100*b*, or a speaker of the IoT device 100*b*. That is, the user can identify that there is a voice utterance that can be merged, and can identify the intent of the voice utterance. Then, the IoT device 100*b* may receive a second voice utterance 904 from the user, and transmit voice data corresponding to the second voice utterance 904 to the voice assistance apparatus 200. The voice assistance apparatus 200 may merge the first voice utterance 902 and the second voice utterance 904 based a possibility of merging as described above.

In some embodiments, the voice assistance device 200 may control the IoT device 100*b* to present information corresponding to the first voice utterance 902 without considering the first condition and the second condition. That is, if the user is just in a vicinity of the IoT device 200*b*, the voice assistance apparatus 200 can control the IoT device 200*b* to present information corresponding to the first voice utterance 902.

In some embodiments, the IoT device 100*b* may further present a message for inquiring whether to perform a voice merging, in addition to the information corresponding to the first voice utterance 902. The message may be presented through at least one of a display of the IoT device 100*b*, or a speaker of the IoT device 100*b*. The user may determine whether to perform a voice merging with the first voice utterance 902, and may provide a command to the IoT device 100*b* instructing whether to perform a voice merging with the first voice utterance 902. The command may be received by the IoT device 100*b* in a form of a voice recognized by a microphone of the IoT device 100*b*, or a touch input through a display of the IoT device 100*b*. If the IoT device 100*b* received command instructing not to perform a voice merging with the first voice utterance 902, the second voice utterance 904 that may be received by the IoT device 100*b* is not merged with the first voice utterance 902. On the other hand, if the IoT device 100*b* received command instructing to perform a voice merging with the first voice utterance 902, the second voice utterance 904 that may be received by the IoT device 100*b* is merged with the first voice utterance 902.

In an embodiment, all the aforementioned voice utterances may not be limited from a single user but also can be provided/received from multiple and/or different users located at difference zones/locations.

The embodiments disclosed herein can be implemented through at least one software program running on at least one hardware device and performing network management functions to control the elements. The elements shown in FIGS. 2 through 9 include blocks which can be at least one of a hardware device, or a combination of hardware device and software module.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for operating an electronic device managing voice-based interaction in an Internet of things (IoT) network system, the method comprising:
   identifying a first voice utterance of a user from a first IoT device among a plurality of IoT devices in the IoT network system, wherein the first voice utterance is generated at a first time and includes a first query;
   identifying at least one second voice utterance of the user from at least one second IoT device among the plurality of IoT devices in the IoT network system, wherein the second voice utterance is generated at a second time and includes a second query different from the first query;
   identifying a user identification (ID) by comparing pre-stored voice information with extracted voice information from at least one voice utterance among the first voice utterance and the at least one second voice utterance;
   sending a trigger signal to wake another IoT device, among the plurality of IoT devices in the IoT network system, the IoT device in a direction the user is moving in order to capture a next utterance of the user using the other IoT device;
   determining a time interval at which voice utterances are received with same user ID;
   determining whether the time interval between the first time and the second time is less than a threshold interval;
   based on identifying that the time interval is less than the threshold interval, generating a voice command by combining the first voice utterance and the at least one second voice utterance;
   determining, by a wearable device of the user, that no IoT device is in proximity of the user and transmitting voice data of the user by Bluetooth low energy (BLE) to an IoT device based on the determination; and
   triggering at least one IoT device among the plurality of IoT devices in the IoT network system to perform at least one action corresponding to the voice command.

2. The method of claim 1, wherein the first IoT device is located at a first location in the IoT network system, and the at least one second IoT device is located at a second location in the IoT network system, and wherein the first location is different than the second location in the IoT network system.

3. The method of claim 1, wherein the first voice utterance of the user is identified in a first time period and the at least one second voice utterance of the user is identified in a second time period.

4. The method of claim 1, wherein the at least one action corresponding to the voice command is determined by:
dynamically detecting an intent from the voice command; and
determining the at least one action corresponding to the voice command based on the intent.

5. The method of claim 1, wherein the generating of the voice command by combining the first voice utterance and the at least one second voice utterance comprises:
recognizing the first voice utterance and the at least one second voice utterance;
determining a confidence level to combine the first voice utterance with the at least one second voice utterance; and
combining the first voice utterance with the at least one second voice utterance based on the confidence level.

6. The method of claim 5, wherein the determining of the confidence level to combine the first voice utterance with the at least one second voice utterance comprises:
determining confidence parameters associated with the first voice utterance and the at least one second voice utterance; and
determining the confidence level of the first voice utterance to combine with the at least one second voice utterance based on the confidence parameters.

7. The method of claim 1, further comprising:
controlling the at least one second IoT device to present a message comprising the first voice utterance based on a distance between the user and the at least one second IoT device.

8. The method of claim 7, wherein the message further comprises an inquiry message for inquiring whether to merge the first voice utterance and the at least one second voice utterance, further comprising:
receiving a response for the inquiry message; and
merging the first voice utterance and the at least one second voice utterance according to the response.

9. An electronic device for managing voice-based interaction in an Internet of things (IoT) network system, the electronic device comprising:
at least one processor configured to:
identify a first voice utterance of a user from a first IoT device among a plurality of IoT devices in the IoT network system, wherein the first voice utterance is generated at a first time and includes a first query;
identify at least one second voice utterance of the user from at least one second IoT device among the plurality of IoT devices in the IoT network system, wherein the second voice utterance is generated at a second time and includes a second query different from the first query;
identify a user identification (ID) by comparing pre-stored voice information with extracted voice information from at least one voice utterance among the first voice utterance and the at least one second voice utterance;
send a trigger signal to wake another IoT device, among the plurality of IoT devices in the IoT network system, the IoT device in a direction the user is moving in order to capture a next utterance of the user using the other IoT device;
determine a time interval at which voice utterances are received with same user ID;
determine whether the time interval between the first time and the second time is less than a threshold interval;
based on identifying that the time interval is less than the threshold interval, generate a voice command by combining the first voice utterance and the at least one second voice utterance;
determine, by a wearable device of the user, that no IoT device is in proximity of the user and transmitting voice data of the user by Bluetooth low energy (BLE) to an IoT device based on the determination; and
triggering at least one IoT device among the plurality of IoT devices in the IoT network system to perform at least one action corresponding to the voice command.

10. The electronic device of claim 9,
wherein the first IoT device is located at a first location in the IoT network system, and the at least one second IoT device is located at a second location in the IoT network system, and
wherein the first location is different than the second location in the IoT network system.

11. The electronic device of claim 9, wherein the first voice utterance of the user is identified in a first time period and the at least one second voice utterance of the user is identified in a second time period.

12. The electronic device of claim 9, wherein the at least one action corresponding to the voice command is determined by:
dynamically detecting an intent from the voice command; and
determining the at least one action corresponding to the voice command based on the intent.

13. The electronic device of claim 9, wherein the at least one processor, in order to generate the voice command by combining the first voice utterance and the at least one second voice utterance, is further configured to:
recognize the first voice utterance and the at least one second voice utterance;
determine a confidence level to combine the first voice utterance with the at least one second voice utterance; and
combine the first voice utterance with the at least one second voice utterance based on the confidence level.

14. The electronic device of claim 13, wherein the at least one processor, in order to determine the confidence level to combine the first voice utterance with the at least one second voice utterance, is further configured to:
determine confidence parameters associated with the first voice utterance and the at least one second voice utterance; and
determine the confidence level of the first voice utterance to combine with the at least one second voice utterance based on the confidence parameters.

15. The electronic device of claim 9, wherein the at least one processor is further configured to:

control the at least one second IoT device to present a message comprising the first voice utterance based on a distance between the user and the at least one second IoT device.

16. The electronic device of claim 15,
wherein the message further comprises an inquiry message for inquiring whether to merge the first voice utterance and the at least one second voice utterance, and
wherein the at least one processor is further configured to:
 receive a response for the inquiry message; and
 merge the first voice utterance and the at least one second voice utterance according to the response.

17. The electronic device of claim 15,
wherein the message further comprises an inquiry message for inquiring whether to merge the first voice utterance and the at least one second voice utterance, and
wherein the at least one processor is further configured to:
 receive a touch input as a response for the inquiry message; and
 refraining from merging the first voice utterance and the at least one second voice utterance according to the touch input received as the response.

* * * * *